(12) United States Patent
Redekop

(10) Patent No.: US 6,478,674 B2
(45) Date of Patent: Nov. 12, 2002

(54) APPARATUS INCLUDING TWISTED BLADES PASSING BETWEEN STATIONARY BLADES FOR CHOPPING AND DISCHARGING STRAW FROM A COMBINE HARVESTER

(76) Inventor: Leo Redekop, Box 178A, R.R.#4, Saskatoon, Saskatchewan (CA), S7K 3J7

( * ) Notice: Subject to any disclaimer, the term of this patent is extended or adjusted under 35 U.S.C. 154(b) by 0 days.

(21) Appl. No.: 09/799,882

(22) Filed: Mar. 7, 2001

(65) Prior Publication Data

US 2002/0004417 A1 Jan. 10, 2002

Related U.S. Application Data

(60) Provisional application No. 60/187,406, filed on Mar. 7, 2000.

(51) Int. Cl.$^7$ ................................................ A01F 12/40
(52) U.S. Cl. .......................................... 460/112; 56/505
(58) Field of Search ................................ 460/112, 111; 56/505, 504

(56) References Cited

U.S. PATENT DOCUMENTS

| | | | |
|---|---|---|---|
| 3,025,067 A | * 3/1962 | Raney et al. | 239/658 |
| 3,693,335 A | * 9/1972 | Mathews | 56/294 |
| 3,963,373 A | * 6/1976 | Macauley | 416/214 A |
| 4,046,488 A | * 9/1977 | Wickham | 416/210 R |
| 4,292,795 A | * 10/1981 | Linn | 56/503 |
| 4,555,061 A | * 11/1985 | Linde | 239/675 |
| 4,892,504 A | * 1/1990 | Scott et al. | 460/112 |
| 5,042,973 A | * 8/1991 | Hammastrand | 460/112 |
| 5,232,405 A | * 8/1993 | Redekop et al. | 460/112 |
| 5,272,861 A | * 12/1993 | Roynberg | 56/504 |
| 5,482,508 A | * 1/1996 | Redekop et al. | 460/112 |

* cited by examiner

Primary Examiner—Robert E. Pezzuto
Assistant Examiner—Árpád, Kovács
(74) Attorney, Agent, or Firm—Adrian D. Battison; Michael R. Williams; Ryan W. Dupuis

(57) ABSTRACT

A chopper and discharge apparatus includes a stationary housing for attachment to the rear discharge of a combine harvester so that straw is fed from the combine into an inlet of the housing and is discharged from an outlet of the housing. Within the housing is mounted a hub for rotation about the horizontal axis with the hub carrying a plurality of lugs at angularly and axially spaced positions therearound, each lug carrying a pair of pivotal blade members which are rotated with the hub in the form of flails. Each lug is associated with a stationary blade on the inside of the housing so that the pair of blades carried on each lug sweep past the stationary blade each on a respective side of the stationary blade. The blade members include some flat cutting blades and some twisted blade members which have a planar base portion attached to the lug, an outer planar blade portion and an intermediate twisted portion twisted about a center line so that the blade portion lies at an angle to the base portion. Where the angle is less than 90 degrees, the blade portion defines a leading edge and a trailing edge lying in two different axially spaced planes and the blade portion tends to generate air flow in an axial direction. Two such blades arranged with opposite angles can be carried on the same lug. Where the blades are arranged adjacent an end of the hub, the blades can be arranged with the angle tending to direct the air toward the same end thus assisting in moving the chopped material outwardly to one side of the combine.

17 Claims, 5 Drawing Sheets

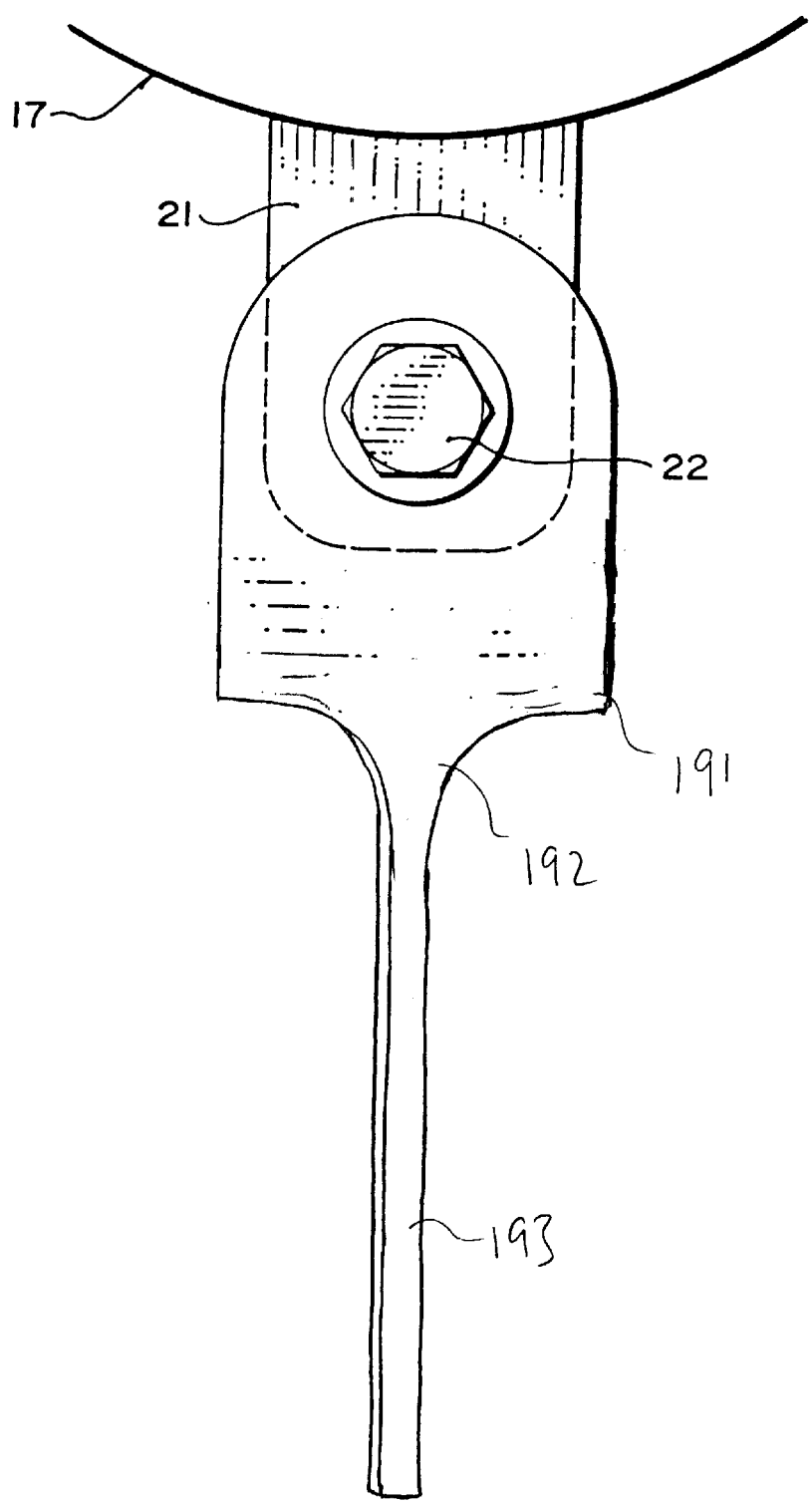

APPARATUS INCLUDING TWISTED BLADES PASSING BETWEEN STATIONARY BLADES FOR CHOPPING AND DISCHARGING STRAW FROM A COMBINE HARVESTER

This application claims priority under 35 U.S.C.119 from provisional application No. 60/187,406 filed Mar. 7th, 2000.

This invention relates to an apparatus for chopping and discharging straw from a combine harvester of the type which includes a plurality of blade members mounted on a hub for rotation about an axis of the hub with the blade members being arranged at spaced positions along the length of the hub substantially in radial planes of the hub so as to pass between a plurality of axially spaced stationary blades again arranged in radial planes of the hub. The straw and other material discharged from the combine is fed into one side of the housing of the apparatus onto the hub and the material is carried around by the hub past the stationary blades in a chopping action. The material is then discharged from a discharge opening in the housing for collection or spreading across the field.

BACKGROUND OF THE INVENTION

The present invention is particularly a modification of or an improvement over the arrangements disclosed in U.S. Pat. No. 5,232,405 issued Aug. 3, 1993 and U.S. Pat. No. 5,482,508 issued Jan. 6, 1996 of the present inventors.

These arrangements show a support plate lying in a radial plane and an additional plate or flap at right angles to the support plate to so that the additional plate lies longitudinally of the hub. The additional plate is inclined so that a radially outer edge of the additional plate lies angularly forwardly of a radially inner edge of the plate. The additional plate is welded across a trailing edge of the support plate and extends out to both sides of the support plate.

These arrangements have achieved considerable commercial and technical success and the present invention is directed to a yet further improvement which builds upon the improvement of the previous patent.

A further arrangement relevant to the present invention is that shown in U.S. Pat. No. 5,042,973 of Hammarstrand which discloses a similar chopping and discharge apparatus having rotating blade members carried on a hub and stationary blades fixed to the housing. The blade members are mounted in pairs so that a single lug carried on the hub supports a transverse pin parallel to the axis of the hub with the blade members mounted on respective sides of the lug and carried on bushings mounted on the pin. The blade members are spaced so that each blade member passes between two of the stationary blades in a cutting action. The blade members are shaped so as to be arch shaped in each cross section transverse to the length of the blade member thus defining a sharpened cutting edge at the leading edge and a sharpened cutting edge at the trailing edge with a center section of the blade bowed outwardly of a plane containing the leading and trailing edges. The blades are shown in face to face or back to back arrangements of the pairs.

A yet further arrangement is shown in U.S. Pat. No. 3,693,335 (Mathews) which shows blades which are inclined from the normal radial plane so as to extend outwardly from the hub in a direction which is inclined to the radial and axial directions.

A yet further arrangement is disclosed in U.S. Pat. No. 4,292,795 (Linn) issued Oct. 6, 1981 and U.S. Pat. No. 4,892,504 (Scott) issued Jan. 9, 1990 both of which show a straw spreader which includes a horizontal fan assembly with two types of blades which rotate about parallel vertical axes on top of a base plate and generate a suction effect tending to draw the straw downwardly into the top of the fan assembly and to expel the straw rearwardly from the back of the base plate.

SUMMARY OF THE INVENTION

It is one object of the present invention to provide an improved chopper and discharge apparatus of the same general type as shown in the above patents of the present inventor.

According to one aspect of the invention there is provided a chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes the blade members to pass generally between the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

each of at least some of the blade members each including a blade formed from a flat strip which has a substantially planar mounting portion mounted on the hub member to lie in a radial plane of the hub member an intermediate portion and a substantially planar blade portion wherein the strip is twisted within the intermediate portion about a line longitudinal of the strip such that the plane of the blade portion lies at an angle to the radial plane and such that one side edge of the blade portion lies in a radial plane offset axially from a radial plane containing the other of the side edges of the blade portion.

Preferably the strip of the twisted blade members is twisted about a center line.

Preferably the strip is of substantially constant width.

In some cases, the plane of the blade portion is at an angle of 90 degrees to the radial plane so that it has little or no tendency to direct air longitudinally of the axis of the hub member.

In other cases, the plane of the blade portion is at an angle less than 90 degrees to the radial plane such that one side edge of the blade portion is angularly advanced relative to the other side edge so that the rotation of the blade members about the axis with the hub member tends to direct air longitudinally of the axis.

Preferably the side edges of the blade portion are sharpened and particularly each side edge is sharpened to a sharp edge lying in one surface of the blade portion which may be the same surface of the blade portion.

Preferably the blades are arranged in pairs with each one of a pair being arranged on a respective side of one of the stationary blades.

Where the blades are arranged in pairs and the angle of the blade portion is such that it generates axial air flow, the blades are preferably arranged with the angle of one of the pair being opposite to the angle of the other.

When arranged in pairs, each pair is preferably mounted on a respective one of a plurality of lugs mounted on the hub member at spaced positions thereon, each lug having a pin mounted thereon with a pin axis of the pin parallel to the axis of the hub member such that the pair of blade members can pivot on the pin about the pin axis.

In one arrangement, some additional flat blade members are carried on the hub member each of which is defined solely by a planar cutting portion lying in a radial plane of the hub axis. In this case there may be more flat blade members adjacent a center of the hub member than adjacent ends of the hub member and thus more angled blades adjacent the ends.

Where the hub member carries some flat blade members and the blade members are arranged in pairs, some of the pairs preferably include one flat blade member and one twisted blade member.

In this arrangement there are preferably more flat blade members adjacent a center of the hub member than adjacent ends of the hub member.

Preferably at least some of the blade members at each end of the hub member are arranged such that the movement of air caused thereby is directed toward the respective end so as to assist in directing chopped material outwardly from that end.

In this case, the blade members at each end of the hub member are preferably arranged such that the total tendency of the movement of air caused thereby is directed toward the respective end.

BRIEF DESCRIPTION OF THE DRAWINGS

One embodiment of the invention will now be described in conjunction with the accompanying drawings in which:

FIG. 5 is a side elevational view of one twist blade member of FIG. 1 on an enlarged scale.

In the drawings like characters of reference indicate corresponding parts in the different figures.

DETAILED DESCRIPTION

Figure 1:
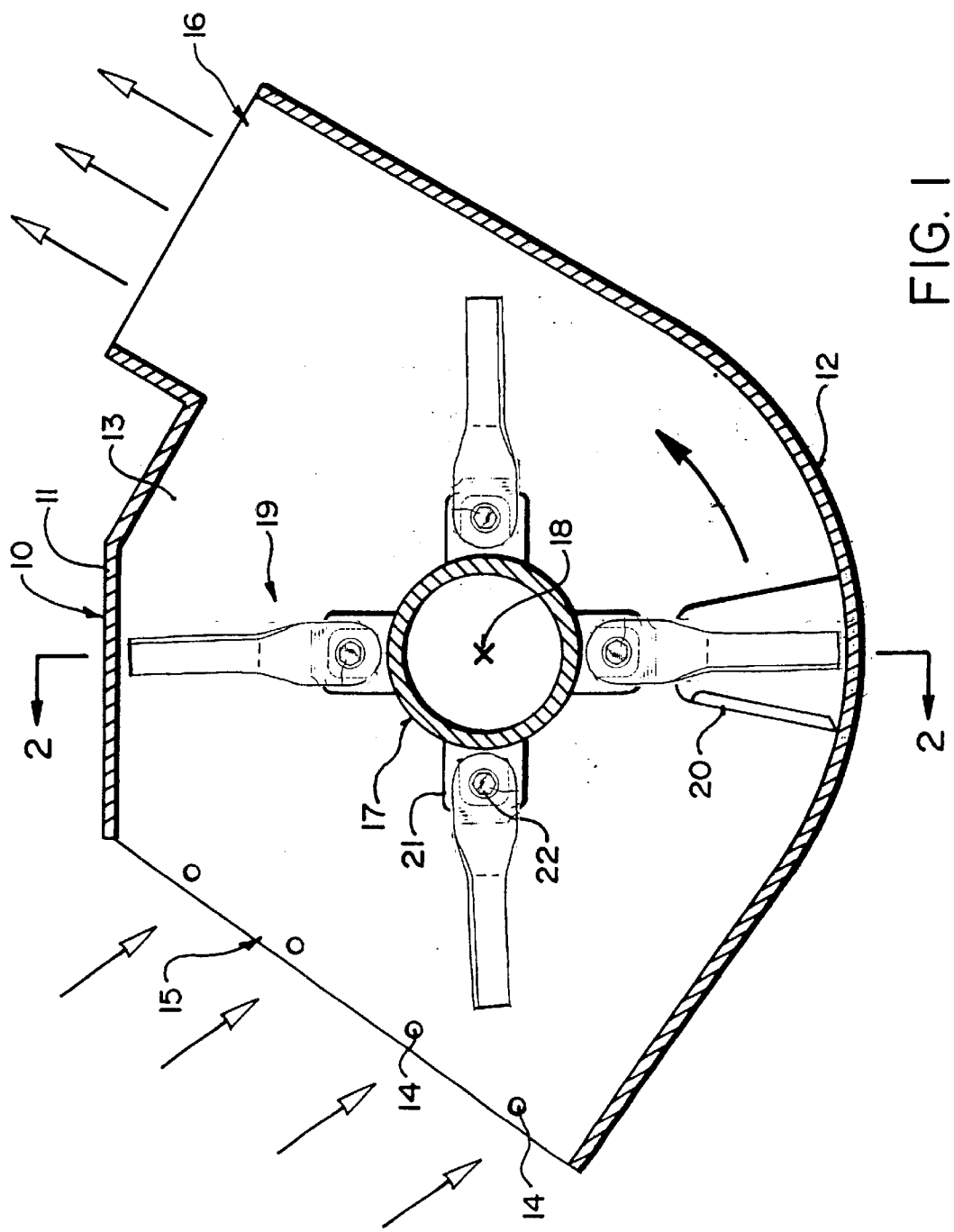
FIG. 1 is a vertical cross sectional view through a chopper and distribution apparatus according to the present invention.

The chopper and discharge arrangement shown in FIG. 1 is very similar to that from the above prior patents of the present inventor which are U.S. Pat. Nos. 5,232,405 and 5,482,508 the disclosures of which is incorporated herein by reference.

The apparatus therefore comprises a housing 10 defined by a top wall 11, a bottom wall 12 and two end walls 13. The end walls 13 include attachment means schematically indicated at 14 for attachment of the housing to the outlet of a combine harvester for discharge of straw and possibly chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field or for transportation into a container.

Within the housing is mounted a hub 17 which is carried on suitable bearings (not shown) for rotation about a hub axis 18 at a center of the housing so that blade members 19 carried by the hub sweep around within the housing to entrap straw fed through the inlet 15 and to carry the straw and air past stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blade members as described in more detail hereinafter for pivotal movement of the blade members about a pin 22 parallel to the axis 18.

Figure 2:
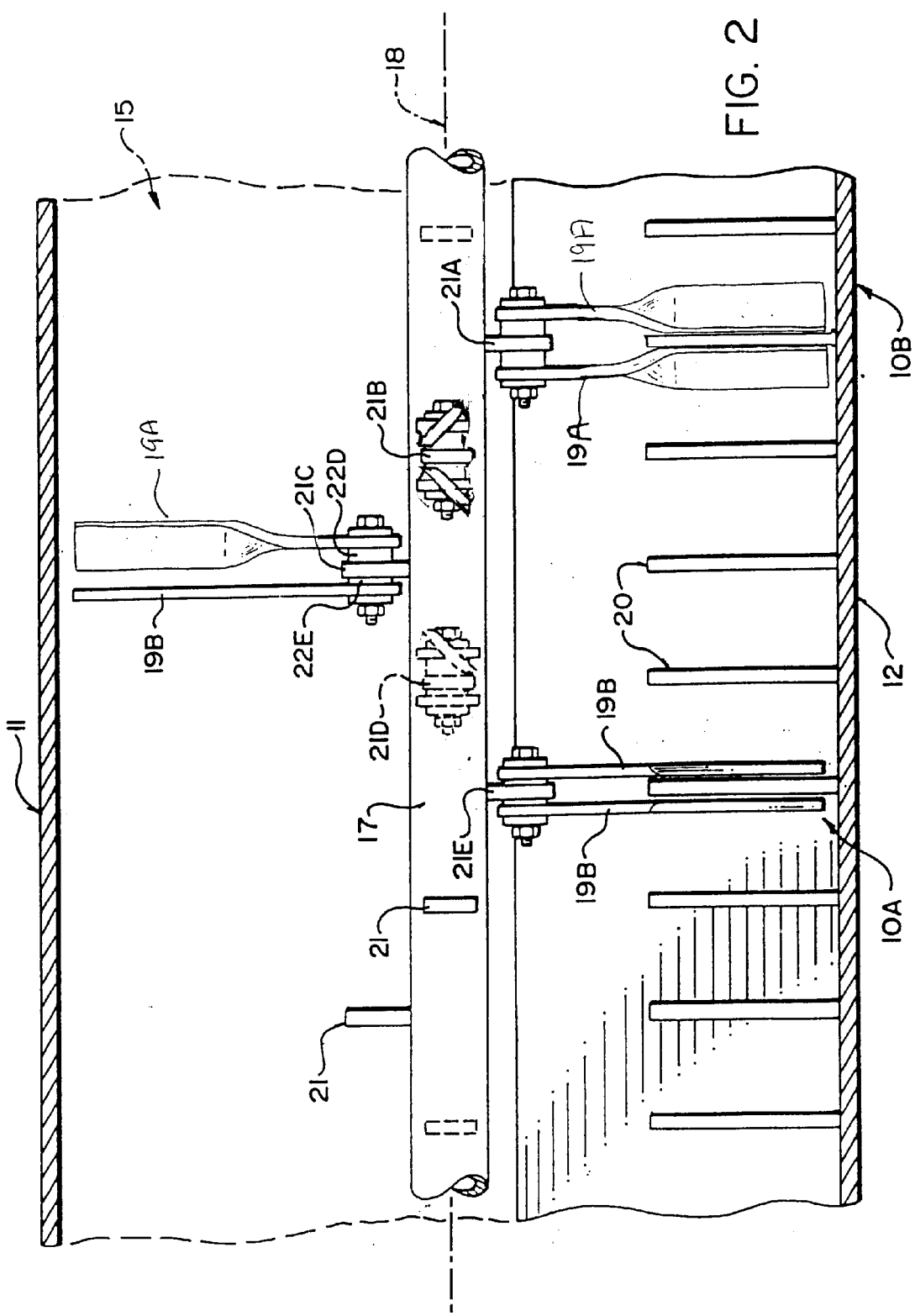
FIG. 2 is a cross sectional view along the lines 2—2 of FIG. 1.

From FIG. 2 it will be noted that the lugs 21 are arranged in a spiral pattern around the hub 17. Thus one of the lugs indicated at 21A is in the orientation of the hub 17 as shown arranged vertically below the hub. A next one of the lugs 21B is arranged on the hub at 90° from the first lug 21A. The next lug 21C is arranged at 90° from the second lug 21B and thus extends vertically upwardly in the orientation as shown. The pattern then continues through a fourth lug 21D and to a fifth lug 21E which is again aligned with the first lug 21A. Each of the lugs carries a pair of blade members. Each lug is aligned with a respective one of the stationary blades 20 so that each stationary blade has associated with it a respective one of the lugs and thus has associated with it the pair of blades carried by that lug. Each stationary blade is thus swept by the blade members once for each rotation of the hub with some of the stationary blades being swept at each of the four 90° positions of rotation of the hub.

The blade members include two types of blade members including twist blade members 19A and flat blade members 19B. Some of the lugs, for example 21A and 21B carry two of the twist blade members 19A. Some of the lugs, for example lug 21E, carry two of the flat blade members 19B. Some of the lugs carry one twist blade member and one flat blade member. The blade members are arranged so that there are more of the flat blade members adjacent a center area 10A of the housing than at an area 10B of the housing which is adjacent one end. It will of course be appreciated that the amount of airflow generated by the twist blade members is significantly greater than that generated by the flat blade members. Thus an increase in the number of twist blade members adjacent the ends of the housing causes an increase in airflow in those areas and it is this airflow at the ends of the housing which assist in discharging the straw materials outwardly to the sides of the chopper. In the center area of the chopper there is less requirement for high air velocity and movement since the straw discharged at the center section is directed rearwardly from the chopper and hence does not require to be discharged over such a great distance. The use of flat blades at the center section reduces manufacturing cost and also reduces horse power requirements due to the reduced amounted of air movement at the center section.

In addition the twist blades, as explained hereinafter, are oriented such that they tend to generate an air flow along the axis of the hub. As shown on the lug 21A there are two twist blades which are arranged so that their angles are opposite thus tending to cancel the tendency to generate axial air flow. As shown on the lug 21C, there is one twist blade and one flat blade so that there is a net tendency to move air axially. The twist blades are arranged so that those adjacent the end walls 13 have a tendency to direct the air toward that end wall thus tending to increase air flow axially outwardly as the air emerges from the rear opening 16 and thus assisting is spreading of the chopped material to the sides. However, it is important to balance the air flow by increasing the use of flat blades at the center or using opposed pairs of twist blades at the center since otherwise a significant reduction in air flow at the center will occur which will reduce the ability of the rotating hub to carry the material at the center away from the combine outlet for discharge.

Figure 3:
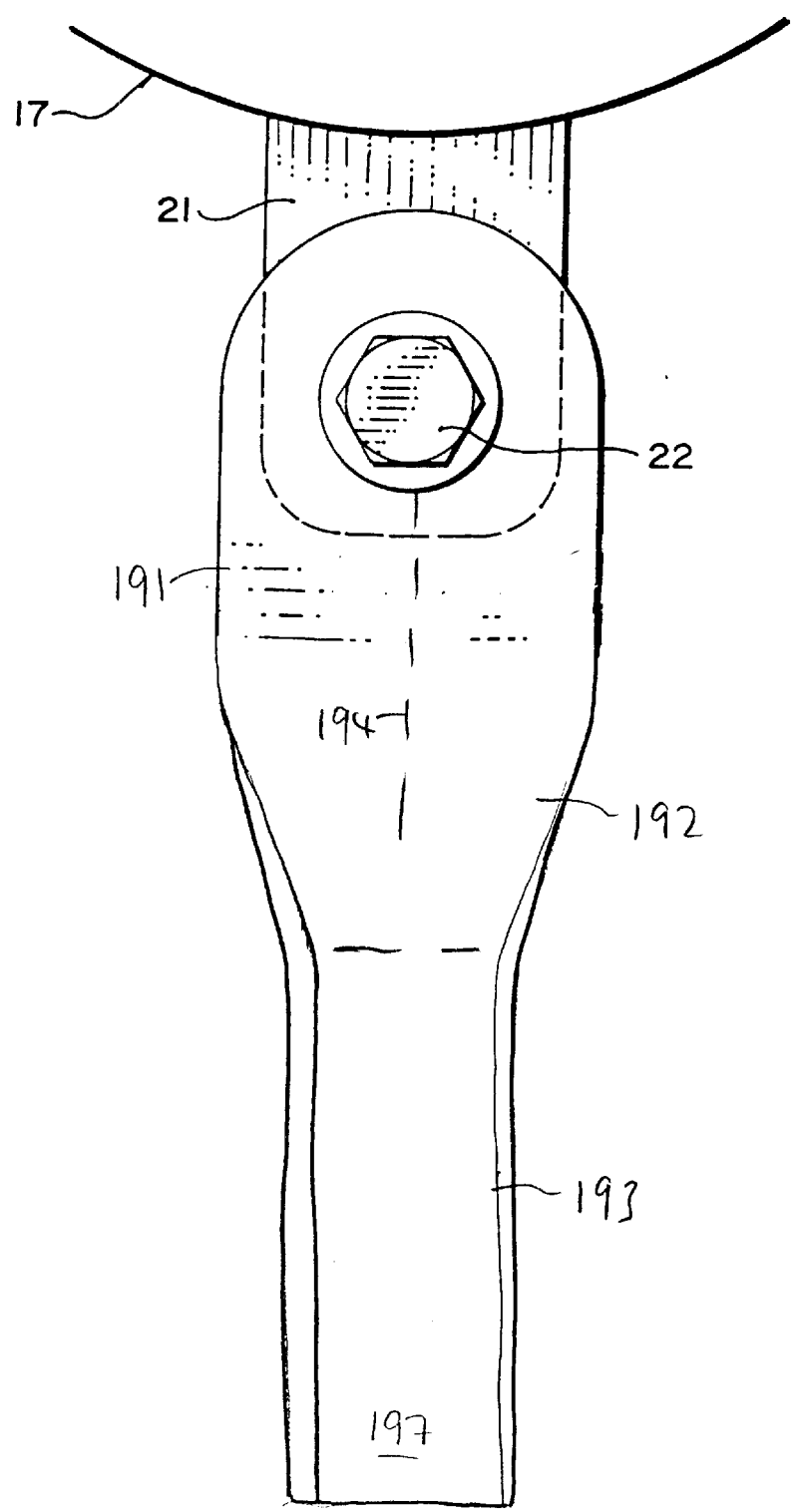
FIG. 3 is a side elevational view of one twist blade member of FIG. 1 on an enlarged scale.
Figure 4:
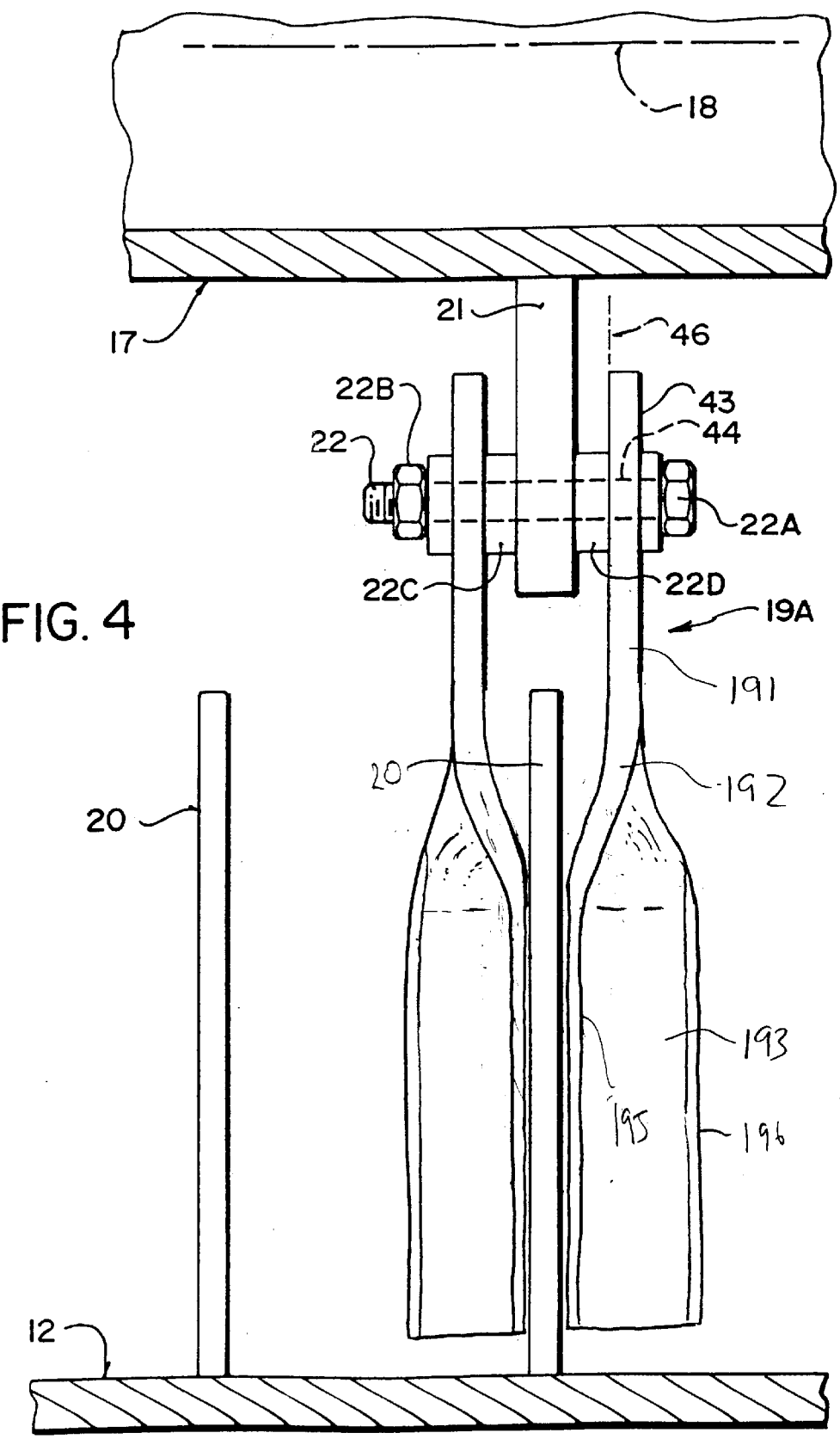
FIG. 4 is a front elevational view of the twist blade member of FIG. 3 on the same scale as FIG. 3.

Turning now to FIGS. 3 and 4, the twist blade members are shown in more detail. Thus each twist blade is formed from a flat strip which has a substantially planar mounting portion 191 mounted on the hub member to lie in a radial plane of the hub member, an intermediate portion 192 and a substantially planar blade portion 193 where the strip is twisted within the intermediate portion about a line 194 longitudinal of and central of the strip such that the plane of the blade portion lies at an angle to the radial plane and such that one side edge 195 of the blade portion lies in a radial plane offset axially from a radial plane containing the other of the side edges 196 of the blade portion. Thus the edge 195 defines a leading edge and passes close to the stationary blade 20 in a chopping or shearing action. The trailing edge is spaced away from the blade 20 and thus does not carryout a shearing action. The strip is of substantially constant width.

In one example shown in FIG. 5 the plane of the blade portion is at an angle of 90 degrees to the radial plane that is to the base portion 191. This reduces the tendency to generate air flow in the axial direction but increase power use as the shearing action is less effective and the whole of the blade portion is at right angles to the radial plane. However this arrangement can be used in some situations either as the only twist blades in the assembly or in combination with other blades where the angle is less than 90 degrees.

Where the plane of the blade portion is at an angle less than 90 degrees to the radial plane one side edge 195 of the blade portion is angularly advanced relative to the other side edge 196. Both the side edges 195 and 196 of the blade portion are sharpened such that each side edge is sharpened to a sharp edge lying in one surface 197 of the blade portion. It is more advantageous to provide an arrangement in which both side edges are sharpened to a sharp edge lying in the same surface 197 of the blade portion since in this way the blade when dulled or worn through use can be reversed to use the other edge which was previously trailing as the leading sharpened edge for the shearing action.

Thus, the modification of the present invention is that the blades are twisted towards the free end such that the frontal surface area of the blade is increased. This in turn increases the amount of air produced by the blades as the blades are rotated at high speed.

Furthermore, the twisting or bending of the blade allows the blade to be reversed when the leading edge wears, thus extending blade life.

The blade is shown schematically in FIG. 1 can be provided in both sharpened edge and non-sharpened edge configurations. The sharpened edge is used to enhance the cutting action of the straw chopper blade. As can be seen in FIG. 1, the sharpened edge blade is bevelled on the same side from the centre of the blade.

The blade can be twisted to any degree, depending on the desired application. Specifically, a slight twist (20°) would increase air flow somewhat to increase spread, but still allow the blades to run very close together for the smallest (fine) cut length. A twist of 45°, on the other hand, would increase air flow significantly and would direct air in a specific direction. As can be seen in FIG. 3, combinations of blades twisted to 45° could be used to enhance spread to the outside by aiming all blades to blow to the sides, or produce a straight back airflow for distance and use spreading fins to change material and air flow direction.

It is important to note that the actual dimensions are not important to the effectiveness of the blade. For example, the end section could be elongated to increase air flow, or shortened to reduce air flow. The twist itself could be long, that is, spread out over the length of the blade so that the blade has only a small effect on air flow. Alternatively, the area over which the blade is twisted could be shortened so as to increase the outward pressure of the air. In addition, hole size, blade thickness, blade length and/or blade width can be similarly varied to effect the specific air flow characteristics of a given blade.

The base, intermediate and blade portions therefore are manufactured from bending a single piece of metal and thus are simple to manufacture without necessity for welding of different pieces.

The blade base portion includes a hole 44 receiving the pin 22. As the blade is twisted about its center line and its center line is straight, it is in effect symmetrical about its center line and its center of gravity lies in the plane 46 directly outwardly from the pin. Thus the centrifugal forces acting on the center of gravity tend to pull the twist blade member directly outwardly from the pin without any twisting of the blade on the pin 22. However the axial air flow will generate some twisting forces but not sufficient that these cannot be accommodated in the pin.

The pin 22 is formed as a bolt with a head 22A and a nut 22B and supports bushings 22C and 22D which engage and carry the two twist blade members 19A carried on the pin 22. The bushings thus hold the twist blade members 19A at a required spacing relative to the lug 21 and thus relative to the stationary blade 20 to ensure passage of the cutting edge 33 as close as possible to the stationary blade without the danger of inter-engagement therebetween.

The twist blade members are arranged as pairs including a left hand member and a right hand member for engagement at respective ends of the pin 22. Thus the cutting edge 33 of each of the blades passes closely adjacent the stationary blade.

As explained in the above previous patents, the blade portion of the twist blade member can also be bent forwardly so that a radially outer most end 40 thereof lies angularly forwardly of a radially inner trailing end 47 thereof so as to generate a high level of air movement to pump air from the inlet through the outlet to generate high velocity in the straw pieces which are ejected from the outlet. However the straight blade portion where the center line remains straight can also generate effective amounts of air flow.

The twist blade member is formed from a single piece of sheet metal which can be stamped and bent to the required shape with a high degree of accuracy so that each blade member has the same weight and the same angles thus enabling the manufacture of the product to higher tolerances and increased balance of rotation of the blades about the hub axis.

As shown in FIG. 4, the positioning of the lugs 21 and the width of the flap portion is arranged relative to the spacing between the stationary blades so that a next adjacent twist blade member as it passes between the stationary blades overlaps the path of movement of its neighbour. In addition, the spacing of the stationary blades relative to the width of the twist blade is arranged so that the outside edge of the flap portion passes the next adjacent stationary blade at a greater spacing than the spacing between the cutting edge and the associated stationary blade but not at such a large spacing to exclude the cutting effect between the outside edge and its associated stationary blade. Each blade therefore passes between two stationary blade and causes a cutting effect in co-operation with both the stationary blades. The overlap also prevents any area of the housing which is not effectively swept by the twist blades as they rotate around the axis of the hub. In one example, the spacing between the stationary blades is of the order of 2.0 inches while the width of the twist blade is of the order of 1.25 inches giving an overlap of the order of 0.5 inches.

As shown in FIG. 2, the flat blade members 19B lies in a common radial plane. For this reason the bushing 22E mounting the flat blade member 19B is narrower than the bushing 22D mounting the twist blade member. This ensures that the clearance between the cutting edge of the flat blade member and the cutting edge 33 of the twist blade member is equidistantly spaced from the stationary blade.

In an alternative arrangement (not shown) no flat blades are used so that all the blades are of the twist blade type. In a yet further arrangement, the blades are not mounted in pairs but are instead mounted on individual mounting lugs at the angular and axial spaced positions previously described.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member lying substantially in a radial plane of said axis and projecting generally outwardly from an inner end at the hub member to an outer end spaced outwardly of the hub member, the blade members being arranged at spaced positions along the length of the hub member such that rotation of the hub member causes the blade members to pass generally between the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

at least some of the blade members being twisted blade members where each twisted blade is formed from a flat strip to define a mounting portion extending from the inner end of the blade member at the hub to an outer end of the mounting portion, an intermediate portion extending from the outer end of the mounting portion to an outer end of the intermediate portion spaced from the outer end of the twisted blade member and a blade portion extending from the outer end of the intermediate portion to the outer end of the twisted blade member;

wherein the mounting portion mounted on the hub member is wholly formed from a substantially planar part of the flat strip so that a plane of the mounting portion lies in a radial plane of the hub member;

wherein the strip is twisted only within the intermediate portion about a line longitudinal of the strip;

and wherein the blade portion is wholly formed from a substantially planar part of the flat strip so that the twist in the intermediate portion arranges a plane of the blade portion to lie at an angle to the radial plane with one of the side edges of the blade portion lying in a radial plane offset axially from a radial plane containing the other of the side edges of the blade portion.

2. The apparatus according to claim 1 wherein the strip is twisted in the intermediate portion only about a center line.

3. The apparatus according to claim 1 wherein the strip is of substantially constant width.

4. The apparatus according to claim 1 wherein the plane of the blade portion is at an angle of 90 degrees to the radial plane.

5. The apparatus according to claim 1 wherein the plane of the blade portion is at an angle less than 90 degrees to the radial plane such that said one of the side edges of the blade portion is angularly advanced relative to the other of the side edges.

6. The apparatus according to claim 1 wherein the side edges of the blade portion are sharpened.

7. The apparatus according to claim 6 wherein each of the side edges of the blade portion is sharpened to a sharp edge lying in one surface of the blade portion.

8. The apparatus according to claim 7 wherein both side edges of the blade portion are sharpened to a sharp edge lying in the same surface of the blade portion.

9. The apparatus according to claim 1 wherein the blade members are arranged in pairs with each one of a pair being arranged on a respective side of one of the stationary blades.

10. The apparatus according to claim 9 wherein the blade members are arranged with the angle of one of the pair being opposite to the angle of the other of the pair.

11. The apparatus according to claim 9 wherein each pair is mounted on a respective one of a plurality of lugs mounted on the hub member at spaced positions thereon, each lug having a pin mounted thereon with a pin axis of the pin parallel to the axis of the hub member such that the pair of blade members can pivot on the pin about the pin axis.

12. The apparatus according to claim 1 including some flat blade members carried on the hub member each of which is defined solely by a planar cutting portion lying in a radial plane of the hub axis.

13. The apparatus according to claim 12 wherein there are more flat blade members adjacent a center of the hub member than adjacent ends of the hub member.

14. The apparatus according to claim 1 including some flat blade members each of which is defined solely by a planar cutting portion lying in a radial plane of the hub axis wherein the blade members are arranged in pairs with each one of a pair being arranged on a respective side of one of the stationary blades and with the sharpened leading edge of the blade members of each pair arranged adjacent the stationary blade, some of the pairs including one flat blade member and one twisted blade member.

15. The apparatus according to claim 14 wherein there are more flat blade members adjacent a center of the hub member than adjacent ends of the hub member.

16. The apparatus according to claim 1 wherein the plane of the blade portion of at least some of the twisted blade members is at an angle less than 90 degrees to the radial plane such that one side edge of the blade portion is angularly advanced relative to the other side edge and such that the blade portion tends to cause movement of air axially of the hub member and wherein at least some of the twisted blade members at each end of the hub member are arranged such that the movement of air caused thereby is directed toward the respective end.

17. The apparatus according to claim 1 wherein the plane of the blade portion of at least some of the twisted blade members is at an angle less than 90 degrees to the radial plane such that one side edge of the blade portion is angularly advanced relative to the other side edge and such that the blade portion tends to cause movement of air axially of the hub member and wherein the twisted blade members at each end of the hub member are arranged such that the total tendency of the movement of air caused thereby is directed toward the respective end.

* * * * *